United States Patent [19]
Moreau

[11] Patent Number: 5,259,335
[45] Date of Patent: Nov. 9, 1993

[54] SEQUENCING GATE FOR MILKING PARLOR

[75] Inventor: Joseph R. Moreau, New Hartford, N.Y.

[73] Assignee: Norbco Inc., Westmoreland, N.Y.

[21] Appl. No.: 992,064

[22] Filed: Dec. 17, 1992

[51] Int. Cl.⁵ .............................................. A01K 1/12
[52] U.S. Cl. .................................... 119/14.03; 119/27
[58] Field of Search .................... 119/14.03, 14.04, 27, 119/155; 49/49

[56] References Cited

U.S. PATENT DOCUMENTS

| | | |
|---|---|---|
| 4,930,447 | 6/1990 | Peacock . |
| 4,977,856 | 12/1990 | Norwood . |
| 5,000,119 | 3/1991 | Moreau et al. ................... 119/14.03 |

FOREIGN PATENT DOCUMENTS

| | | | |
|---|---|---|---|
| 1018025 | 9/1977 | Canada ................. 119/27 |
| 0350558 | 1/1990 | European Pat. Off. ......... 119/14.03 |
| 0447822 | 9/1991 | European Pat. Off. .............. 119/27 |
| 7802256 | 9/1979 | Netherlands ..................... 119/14.03 |
| 175459 | 3/1961 | Sweden ................. 119/27 |

*Primary Examiner*—Cary E. O'Connor
*Assistant Examiner*—Todd E. Manahan
*Attorney, Agent, or Firm*—Wall and Roehrig

[57] ABSTRACT

A sequencing gate for a side-by-side milking parlor employs a gate member formed as a loop having an open center. The gate member has lower and upper rail portions with a distal portion joining the distal ends of the upper and lower portions, and a proximal portion joining the proximal ends of these portions. A vertical pivot member extends downward from the lower horizontal rail portion into a supporting journal member but does not extend into the open central part of the loop. With this arrangement, the cows can be positioned to stand with their barrels touching one another through the open center of the gate. The gate has no fixed vertical member which would obstruct movement of the cow's barrel as she enters or exits the milking parlor stall.

6 Claims, 5 Drawing Sheets

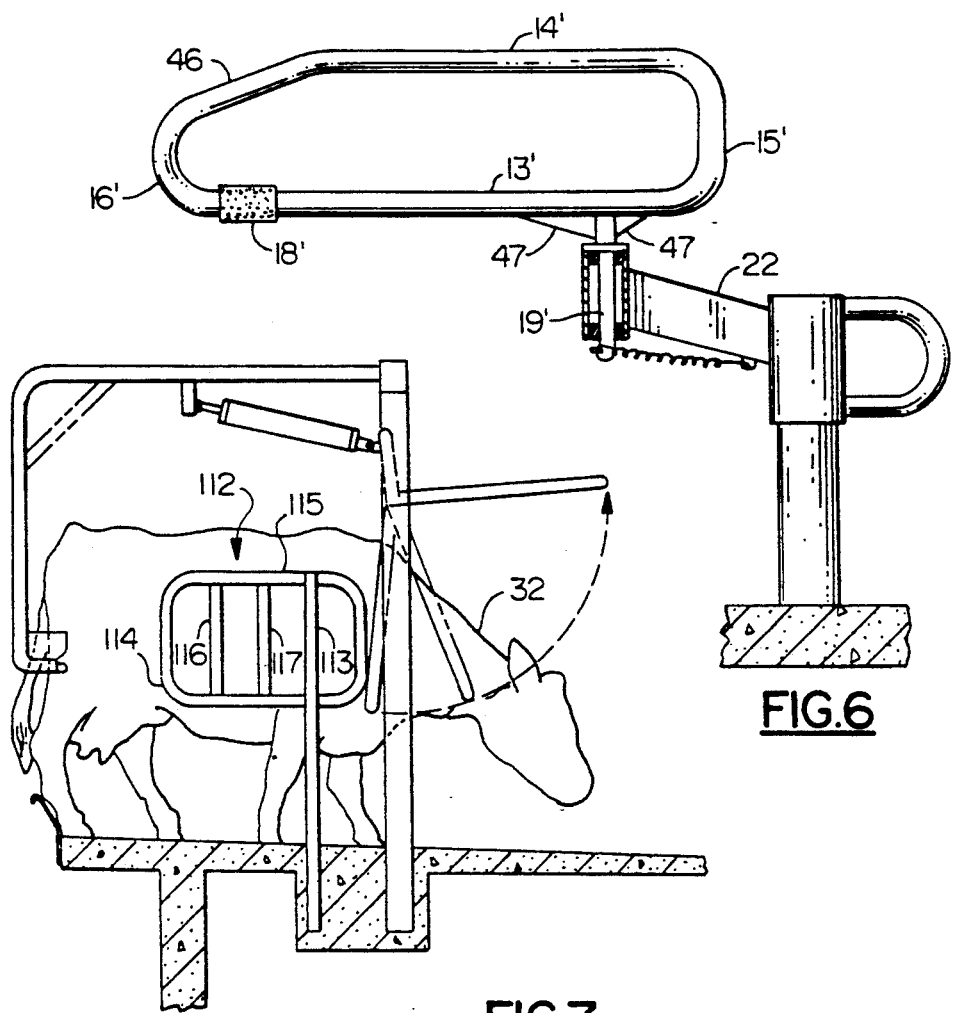
FIG.6
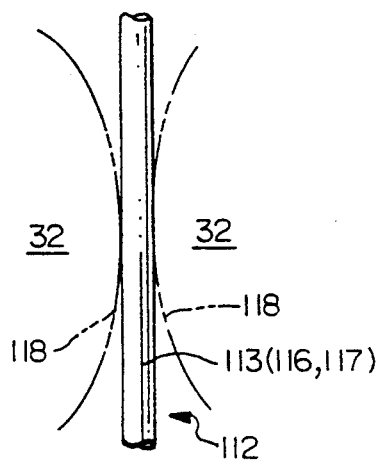
FIG.7
Prior Art
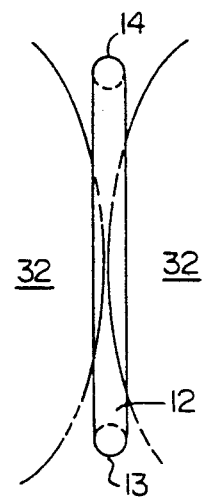
FIG.8A
Prior Art
FIG.8B

SEQUENCING GATE FOR MILKING PARLOR

BACKGROUND OF THE INVENTION

This invention relates in general to the field of cattle stalls, and in particular, to milking parlors and milking stalls designed for compactness, efficient parlor operation and maximum comfort for the cow.

A milking parlor generally consists of an array of individual stalls, each designed to hold a cow or other dairy animal while she is being milked. An attendant or operator is usually required to be present at the parlor to perform such tasks as ensuring that the animals are properly situated in the stalls; washing the udders prior to milking; applying milker units; and monitoring and attending to the operation of the milker units.

A recent development in parlor design has yielded the so-called side-by-side or parallel stall configuration. Here, the cow is positioned facing outwardly from the operator and milking takes place at the rear of the cow, between the hind legs. Variations of this design are a v-shaped parlor arrangement and a curved parlor arrangement, the latter being discussed in U.S. Pat. No. 5,000,119 having the same assignee as this matter.

These side-by-side parlors are designed so that cows enter through an entry gate into an aisle or pathway along the rear side of the parlor and then turn approximately ninety degrees and enter the furthest stall that is not yet occupied by a cow.

In order to ensure that the cows proceed as far as they can go before entering a stall, and to ensure that there are no stalls left unoccupied, a scheme of sequencing gates is used for directing the cows down the aisle and into the farthest unoccupied stall.

The milking parlor has a rear wall that defines one side of the entry aisle, dividers which serve as side walls, and an exit gate at the front of each stall. The rear wall defines the milker position, and the cows' hind legs are positioned against this wall. The front or exit gate can be of a swinging or race-gate design with doors that swing open to release the cow, or can be of an upward swinging or lifting design, which moves upward or above the cow to release her from the stall. The sequencing gate forms a part of the side wall that separates the cows from one another. The sequencing gate is preferably a cow-operated swing gate turning on a vertical pivot. In a first position, the gates are disposed across the stalls, and with the rear wall define the entry aisle for the cows into the parlor.

In this position the gate extends across the stall so that a cow will proceed to the next unoccupied stall in sequence. As the cow enters the stall, she swings the gate to a second or open position, which opens the next adjacent stall and blocks off the aisle or passageway. The next cow in sequence is thus directed into the next adjacent stall. The gates are designed with a distal nose position that extends to one side of the pivot. When the cow enters the stall she encounters this nose portion and pushes against it. A major, proximal position extends on the other side of the pivot and in the first position mentioned above extends across the next adjacent stall to deny entry into that stall. When a cow enters the stall and passes against the nose position, she swings the gate major portion out to open the next stall and to block the entry aisle.

The vertical pivot is usually a solid post that extends the height of the sequencing gate. Thus, a solid, non-movable member encounters the widest part of the cow, namely her barrel. Consequently, the stalls must be wider than is actually needed for good positioning and milking, in order to permit the cows to enter and exit comfortably past the non-movable member.

One example of a sequencing gate is shown in U.S. Pat. No. 5,000,119 mentioned earlier. Another sequencing gate is described in U.S. Pat. No. 4,930,447 granted Jun. 5, 1990.

OBJECTS AND SUMMARY OF THE INVENTION

Accordingly it is an object of the invention to improve the design of sequencing gates for side-by-side milking parlors, and to facilitate a simpler, more compact design for the parlor.

It is another object to provide a sequencing gate whose structure avoids fixed members which may obstruct the entry or exit of the cow.

It is a further object to provide a sequencing gate which permits the cows in the parlor to be positioned close together with their barrels or bellies touching one another.

According to an aspect of this invention, the sequencing gate is formed of a loop of steel tubing or other suitable material, with the center (i.e., within the loop) being open. The gate has a lower horizontal rail member, an upper horizontal rail member, a distal portion joining the distal ends of the upper and lower members, and a proximal portion joining the proximal ends of the upper and lower members. A pivot arm projects vertically downward from the lower horizontal member into a journal member supported on a support arm that projects proximally back from a clamp or other support member that is affixed to the parlor assembly. A spring or other similar device is attached to the pivot arm to rotate the gate towards its closed position across the stall. The vertical pivot arm defines a vertical swings axis for the gate with a minor portion distal of the pivot axis projecting part way across one stall, and a major portion proximally of the swing axis extending across an adjacent stall. A cow entering a stall pushes against the minor portion and swings the major portion away from the next stall to permit the next cow to enter it.

The open structure of the loop, with no vertical member extending through it, permits the cows to be positioned with their barrels touching each other through the gate. Thus the lateral distance from one stall to the next can be kept to a minimum. The other vertical gate structure, that is, the proximal and distal parts move to accommodate passage of the cow when she enters or exits the stall. This eliminates any danger of bruising or injuring the barrel of the cow on the sequencing gate.

The above and many other objects, features, and advances of this invention will become apparent from the ensuing description of one illustrative preferred embodiment, when read in conjunction with the accompanying Drawing.

BRIEF DESCRIPTION OF THE DRAWING

FIG. 6 is a sequencing gate according to an alternative embodiment

FIG. 7 is an elevational view showing a typical sequencing gate of the prior art.

FIG. 8A is a schematic rear view illustrating cow clearance for the sequencing gate of FIG. 7.

FIG. 8B is a schematic rear view illustrating cow clearance for the sequencing gate of this invention.

DETAILED DESCRIPTION OF THE PREFERRED EMBODIMENT

Figure 1:
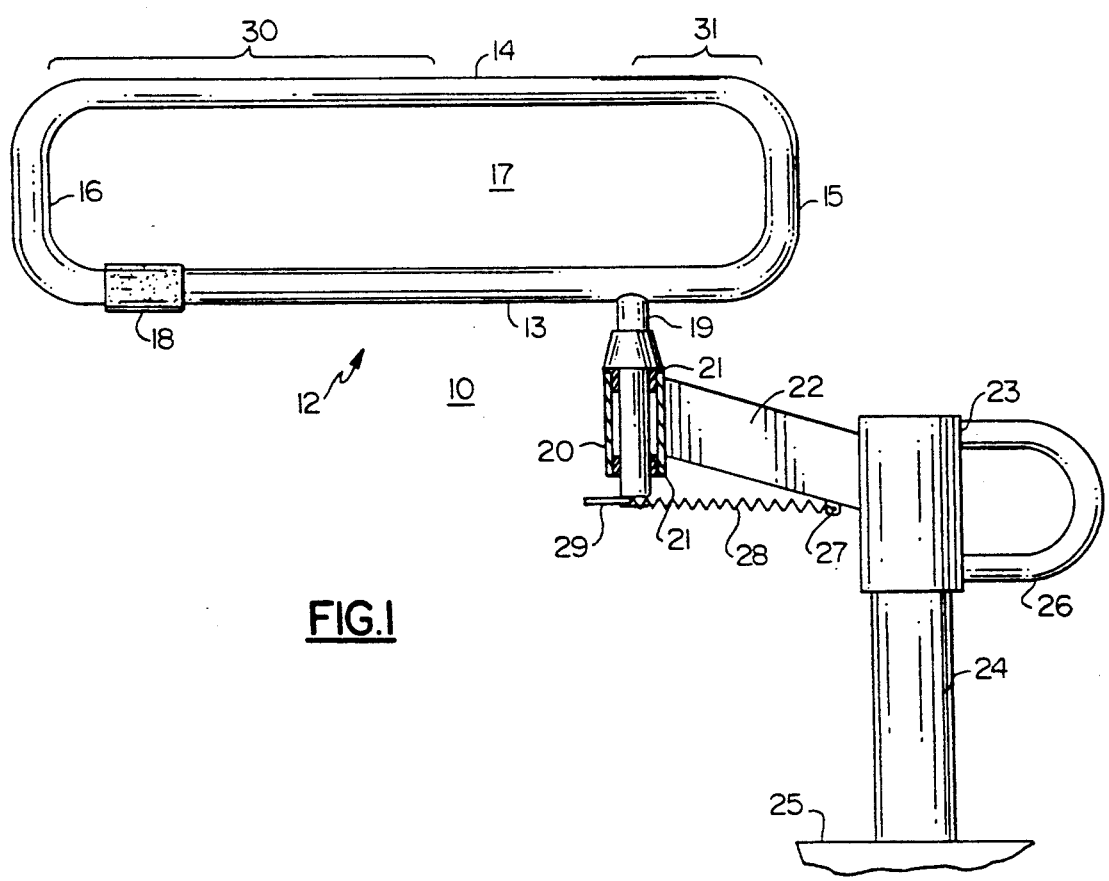
FIG. 1 is a side elevation of a sequencing gate arrangement according to one preferred embodiment of this invention.

With reference to the Drawing, and initially to FIG. 1, a sequencing gate assembly 10 has a gate member 12 in the form of a elongated loop, open at the center. Gate member is preferably formed by bending a single length of tubular steel, typically 1.66" o.d. diameter tubing. The loop of the gate member 12 is formed of a lower horizontal member 13, an upper horizontal member 14, a distal or forward member 15 that joins the distal ends of the horizontal members 13 and 14, and a proximal or rearward member 16 that joins the proximal ends of the horizontal members 13 and 14. The gate member 12 has an open center 17, that is, with no obstructions within the periphery defined by the members 13, 14, 15 and 16. In this embodiment a rubber bumper 18 is disposed near the distal end of the lower horizontal member 13. However, this bumper 18 is optional.

A vertical pivot member 19, here affixed to the lower horizontal member 13 near its distal end, extends downward into a pivot journal 20 where low friction bushings 21, e.g. rings of PVC or other suitable material, support the pivot member 19 for movement about a vertical axis. Here, a support arm 22 extends from a main support sleeve 23, and carries the pivot journal 20 at its proximal end. The support sleeve 23 is mounted upon a post 24 which is affixed into a floor or cow stand 25 of the associated milking parlor. A nose portion or loop 26 of steel tubing, affixed onto the distal side of the sleeve 23, assists in dividing between stalls.

An anchor 27 is formed on the support arm 22 and a distal end of a coil spring 28 is attached to the anchor. The proximal end of the spring 28 is connected to a swing arm or pivot arm 29 attached to a lower end of the pivot member 19. This spring biases the gate into its closed position.

Figure 2:
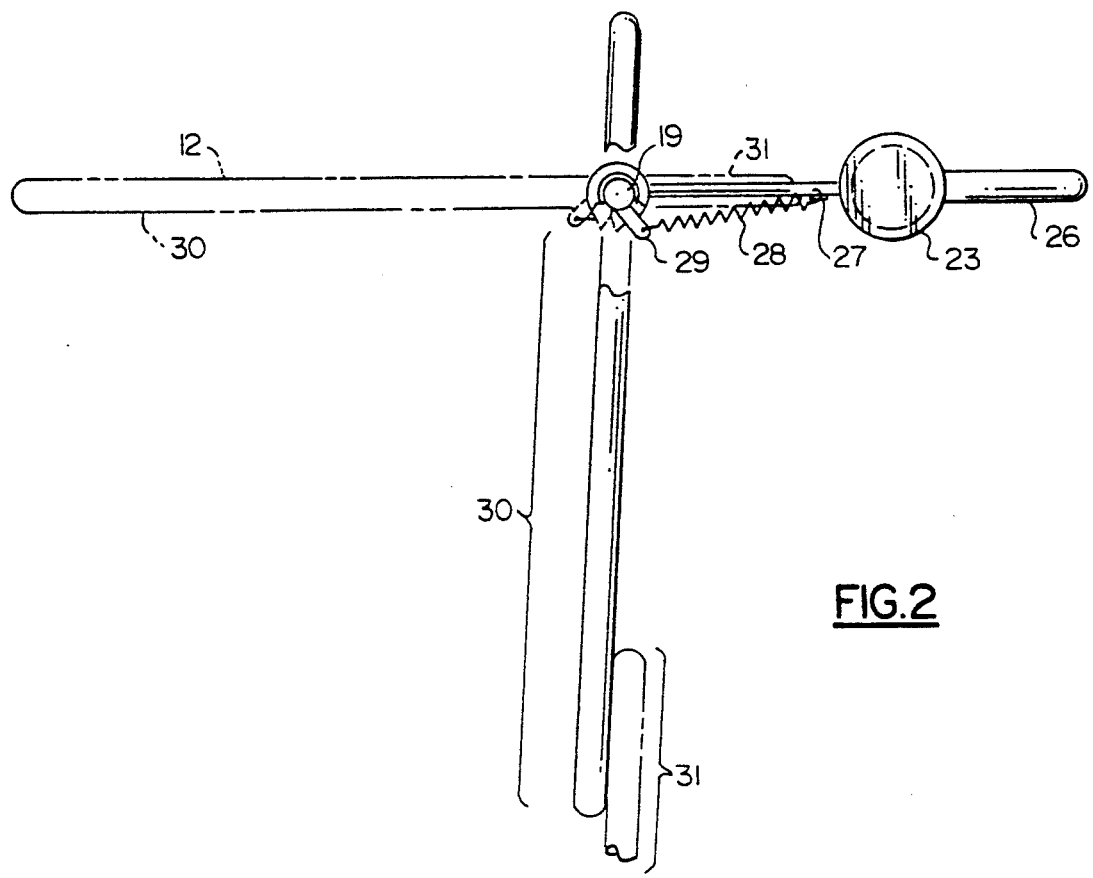
FIG. 2 is a top view, partly cut away, of the sequencing gate in a closed position and, in ghost lines, in an open position.

As better shown in FIG. 2, the pivot member 19 defines a vertical axis through the gate member 12 and divides the same into a major or proximal portion 30, extending from the vertical axis to the proximal member 16, and a minor or distal nose portion 31, which extends forward from the axis forward to the distal member 15. In a normal or closed position, as shown in solid lines in FIG. 2, the major portion 30 laps over and lands on the minor portion 31 of the next successive sequencing gate member 12. In an open position, as shown in ghost lines, the gate member 12 extends in line with the support arm 22, post 24, and nose portion 26 to form the dividing wall between the successive cow stalls.

Figure 3:
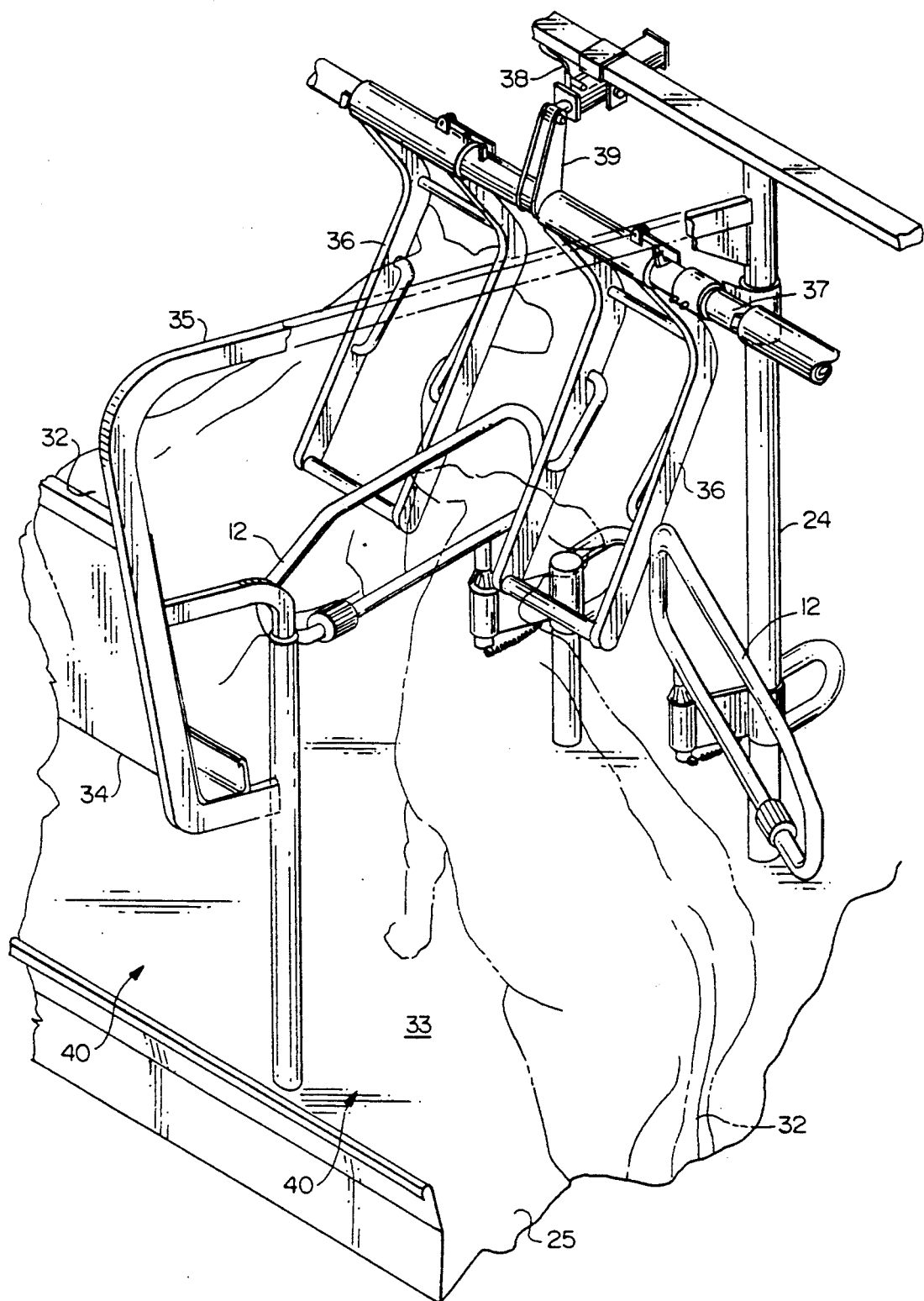
FIG. 3 is a perspective view of a portion of a side-by-side milking parlor featuring the sequencing gate of this invention.

FIG. 3 is a perspective view illustrating a portion of a milking parlor that features the sequencing gates as shown in FIGS. 1 and 2. Here a cow 32 is shown proceeding along an entry aisle 33 formed between sequencing gates 12 on one side and a manure shield 34 on the other, which forms a proximal or back wall for the cow stalls of the milking parlor. A support frame 35 for the milking parlor supports the shield 34. Main posts 24 support respective exit gates 36 which define front or distal ends of the milking parlor stalls. These exit gates 36 are of the lifting type which swing between closed and open or release positions. The gate swings about a horizontal pipe axis 37, here mounted on the main post 24. A pneumatic cylinder 38 mounted on the frame has its rod attached to a pivot arm 39 to rotate the pipe axis 37 and the associated exit gates 36 between the lowered position (as shown) and the raised position where the cows 32 are permitted to exit.

Figure 4:
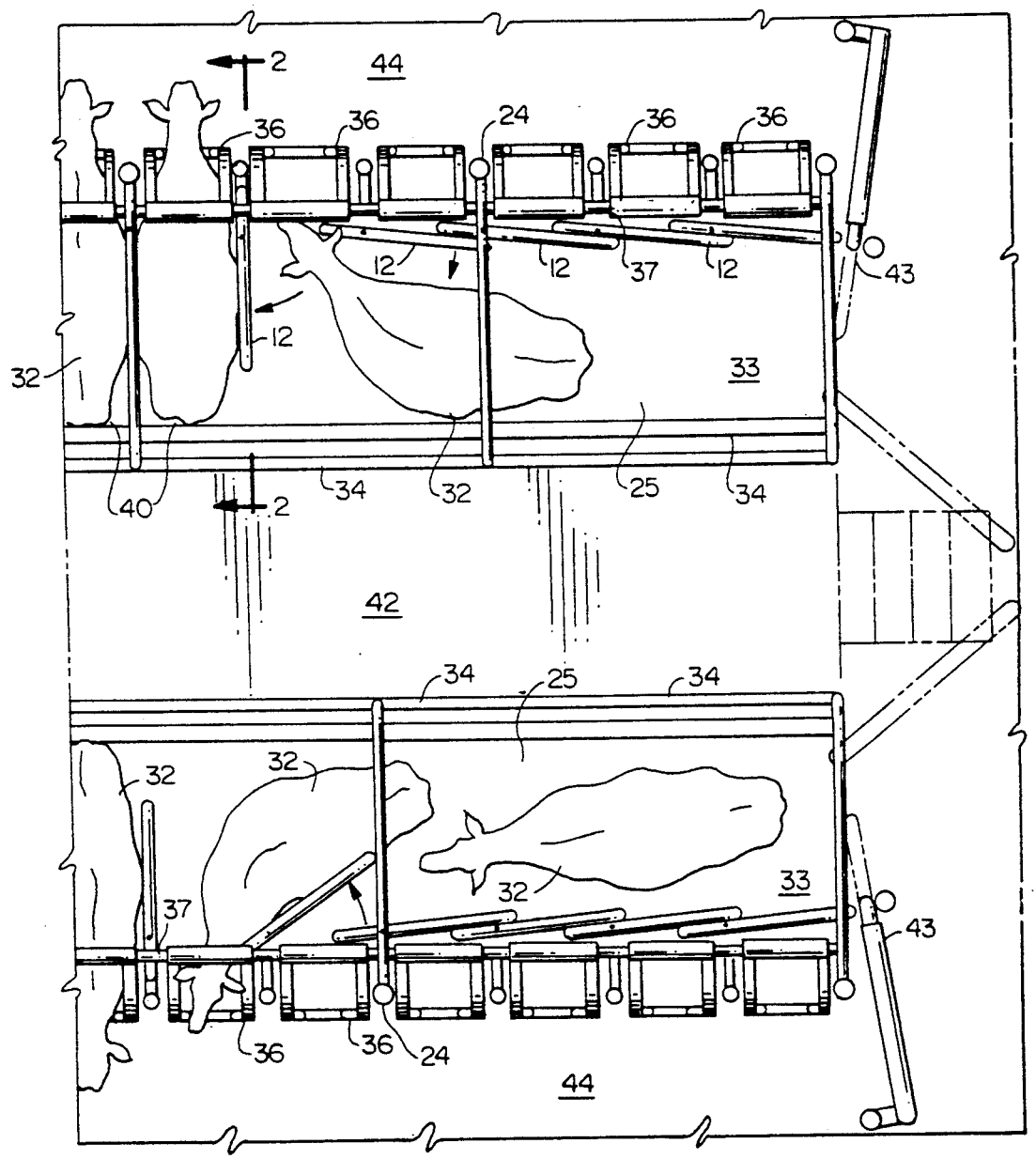
FIG. 4 is a top plan view of a milking parlor with the sequencing gates of this invention.

Stalls 40, better shown if FIG. 4, are defined between pairs of sequencing gates, which form its sidewalls, the manure shield which forms its proximal wall 34 and the respective exit gate 36 which forms a distal or front end.

FIG. 4 is a top plan view showing a milking parlor assembly of a double arrangement, with sets of frames, exit gates 36, manure shield 34, and cow stand 25, disposed on opposite side of an operator pit 42. This view shows cows 32 proceeding through an entry gate 43 for each of the respective sides, and then proceeding down the entry aisle formed between the closed sequencing gates 12, on the one side, and a manure shield 34 on the other. Each cow 32 proceeds to the farthest unoccupied stall, and then turns outward, and proceeds to place her head through the associated exit gate 36. As she does this, the cow nudges against the sequencing gate 12, and turns it towards its open position. This opens the next stall in sequence, so that the following cow 32 will enter the next stall in succession.

When milking is completed, the cows are released by lifting the exit gates 36, and then the cows can proceed outward, that is, away from the pit 42 and proceed out of the milking parlor along an exit lane 44.

In this arrangement, the cows 32 are all milked from behind, with the cows standing barrel-to-barrel. This reduces the distance between cows 32 to a minimum, making it easier for the operator to wash the udders, attach the milker units, and perform the other required tasks. This arrangement also reduces the size of the milking parlor for a given number of cows to be milked.

Figure 5:
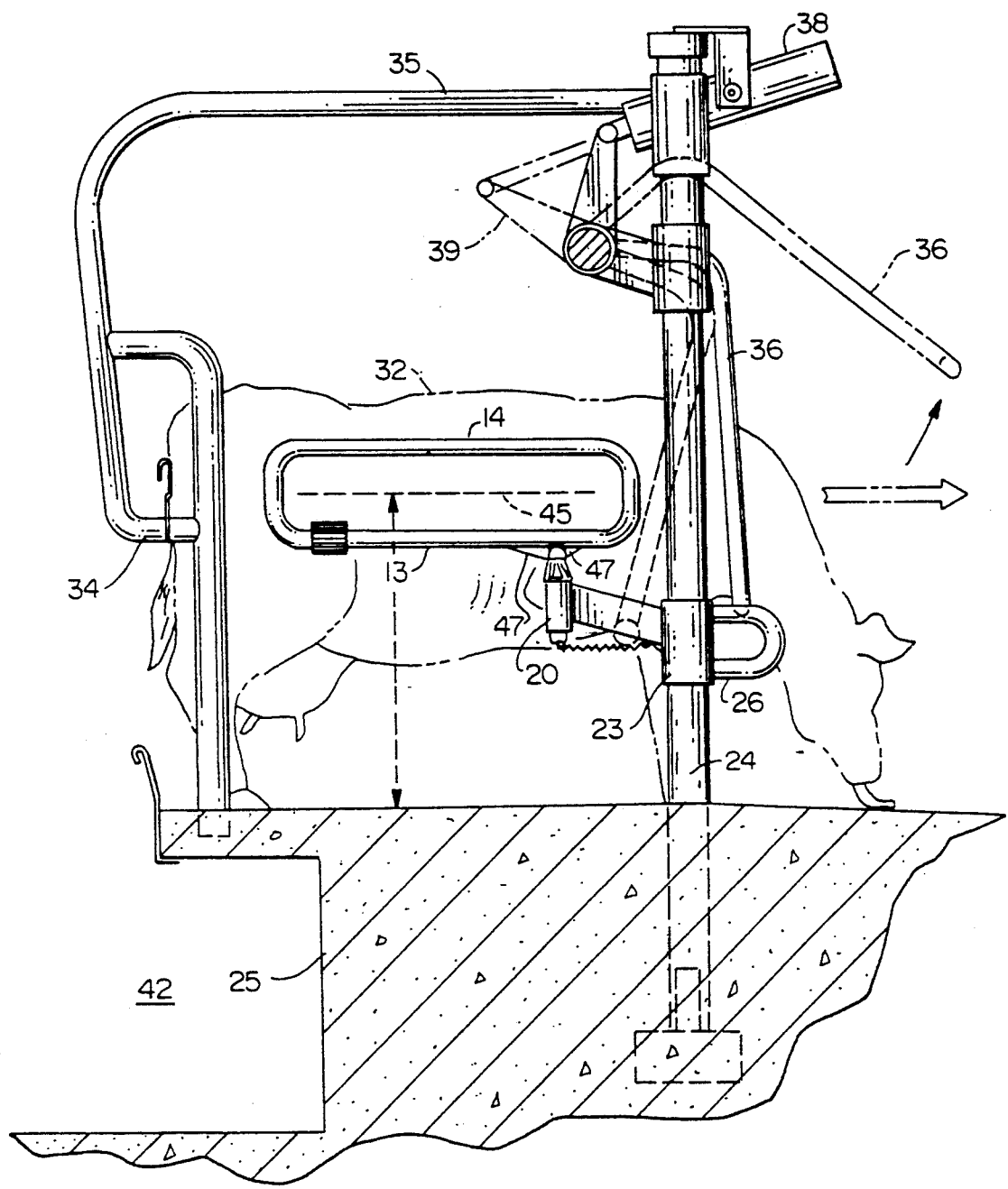
FIG. 5 is an elevation taken at 5—5 of FIG. 4.

FIG. 5 shows an occupied cow stall, as taken along line 5—5 of FIG. 4. Here, the gate member 12, shown in its open position, in relation to the cow 32 occupying the stall. The horizontal members 13 and 14 are positioned so that a horizontal line 45 midway between is approximately thirty-six inches (i.e. ninety centimeters) above the floor or cow stand 25. This height represents the location of the widest part of the cow, that is, the barrel or belly. There are no fixed vertical members at this level of thirty-six inches which would obstruct the barrel of the cow as she enters or exits the stall. When the cow exits, the vertical portions 15 and 16 are free to swing out of the way.

The exit gate 36 shown in this example is self-indexing. That is, in the lowered positioned, as shown in solid lines, a yoke portion of the exit gate 36 rests upon the cow's shoulders. The gate 36 is formed in an arch, so that it applies a force due to gravity on the cow to urge her rearward, that is, towards the manure shield 34. The force applied here is about five to twenty-five pounds, so that there is no discomfort to the cow. This feature is described in co-pending patent application Ser. No. 07/014,551, filed Feb. 5, 1993, having a common assignee herewith.

FIG. 6 illustrates one alternative embodiment of the sequencing gate of this invention, where the gate member is of generally similar shape, but has a tapered or sloping portion 46 joining the distal part of the upper horizontal member 14' to the vertical member 16. The pivot member 19' extends downwardly from the lower horizontal member 13', as in the previous embodiment.

A typical prior art sequencing gate 112 is shown in FIG. 7 in connection with a typical milking parlor. In this case, there is a vertical pivot bar 113 extending between the lower and upper horizontal members 114, 115, and additional vertical bars 116 and 117 that also separate the cows 32 that are standing in adjacent stalls.

As shown in FIG. 8A, the cows' bellies or barrels 118 (illustrated in ghost) are kept apart by the presence of the vertical elements 113, 114 and 115.

In contrast with the foregoing, the corresponding sequencing gate 12 of the present invention, as shown in FIG. 8B, which has no such vertical members, permits the bellies or barrels of the cow 32 to touch through the open center part of the gate. With the prior art arrangement, the stall must be wider for the cow 32 to enter and exit comfortably past the non-movable vertical bar 113, than is actually required for good positioning of the cow for milking. The sequencing gate 12 of this invention permits this extra distance between stalls to be eliminated, and minimizes the total length of the parlor.

In other possible variations, the support arm 22 can be spring loaded for sideways deflection. Further, while gussets 47 are shown to bolster the attachment of the pivot member 19' to the lower horizontal member 13', these are not critical to the invention. Also, instead of the tension spring 26, a torsion spring or a flat spiral clock spring could be employed to urge the gate towards its first or closed position. Alternatively, a gravitational mechanism can be employed to urge the gate towards its closed position.

While this invention has been described in detail with reference to a preferred embodiment, it should be understood that the invention is not limited to that precise embodiment. Rather, many modifications and variations would become apparent to those skilled in the art without departing from the scope and spirit of this invention, which is defined in the appended claims.

What is claimed is:

1. Sequencing gate of a side-by-side milking parlor arrangement which is comprised of a plurality of side-by-side cow stalls, said gate having a normal first position across an associated one of the cow stalls and defining an entry aisle into said stalls, and swingably movable to a second position blocking said entry aisle for directing cows entering the parlor into the farthest unoccupied stall along said entry aisle; said sequencing gate comprising a gate member formed as a loop having an open center, including a lower horizontal rail portion, an upper horizontal rail portion, a distal portion joining distal ends of the upper and lower horizontal portions, and a proximal portion joining proximal ends of the upper and lower horizontal portions; a vertical pivot member extending outward from one of said horizontal rail portions but not extending between said horizontal rail members, said pivot member defining a vertical swing axis for said gate member; a support member affixed onto said milking parlor arrangement; a journal member supported on said support member and journalling said pivot member; and means yieldably biasing said gate member to said first position.

2. Sequencing gate according to claim 1 wherein said gate member is entirely open within said loop so that the barrels of cows positioned in adjacent cow stalls contact one another through said gate member.

3. Sequencing gate according to claim 1 wherein said gate member is formed of a single length of steel tubing bent into said upper and lower horizontal rail portions, said proximal portion and said distal portion.

4. Sequencing gate according to claim 1 wherein said upper and lower horizontal rail portions are positioned respectively above and below a line that is substantially thirty-six inches above a cow stand floor of said milking parlor arrangement.

5. Sequencing gate according to claim 1 wherein in the normal, first position, the distal portion of said gate member overlaps and lands onto the proximal portion of a next succeeding gate member.

6. Sequencing gate according to claim 1 wherein said support member includes an arm that projects proximally from an attachment means on said milking parlor arrangement, and said journal member is carried on a proximal end of said arm.

* * * * *